United States Patent
Gibson et al.

(10) Patent No.: US 6,970,413 B2
(45) Date of Patent: Nov. 29, 2005

(54) DATA STORAGE MEDIUM UTILIZING DIRECTED LIGHT BEAM AND NEAR-FIELD OPTICAL SOURCES

(75) Inventors: Gary A Gibson, Palo Alto, CA (US); Alison Chaiken, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 461 days.

(21) Appl. No.: 09/865,940

(22) Filed: May 25, 2001

(65) Prior Publication Data

US 2002/0176349 A1    Nov. 28, 2002

(51) Int. Cl.$^7$ ............................................... G11B 7/00
(52) U.S. Cl. ................................................. 369/126
(58) Field of Search ........................ 369/126, 112.23, 369/100, 44.37

(56) References Cited

U.S. PATENT DOCUMENTS

| | | |
|---|---|---|
| 5,557,596 A | 9/1996 | Gibson et al. |
| 5,808,973 A | 9/1998 | Tanaka |
| 6,185,051 B1 | 2/2001 | Chen et al. |
| 6,473,388 B1 * | 10/2002 | Gibson ..................... 369/126 |
| 6,643,248 B2 * | 11/2003 | Naberhuis et al. ......... 369/126 |

OTHER PUBLICATIONS

Apertureless near-field optical microscope (Abstract) F. Zenhausern, M. P. O'Boyle, and H. K. Wickramasinghe.

* cited by examiner

Primary Examiner—Nabil Hindi

(57) ABSTRACT

A data storage unit having a data storage layer with multiple storage areas having a medium disposed thereon that changes between a plurality of states for writing and reading information thereon includes an array of light emitters, such as laser light probes or near-field light sources, spaced in close proximity to the data storage layer for selectively directing light beams to the data storage layer during write and read phases. Data is stored by directing a first light beam to the medium to change to a state representative of data. Data is read by exciting the storage areas with a second directed light beam on the medium. Alternately, the light energy beams in the write or read phases may be generated by a near-field optical system generating evanescent fields. The medium generates electron-hole pairs having substantially different activity in each storage area, depending upon its state. The electron-hole pairs generate activity in a detection region in communication with the storage area that is measured to detect the presence of data. The detection region may comprise a semiconductor diode junction, a photoconductive region or a photo-luminescent region. The presence of data in the storage areas is determined by the number of carriers flowing across the semiconductor junction, the number of carriers flowing in the photoconductive regions between electrodes, or the number of photons generated in the detection portion of the photo-luminescent region.

25 Claims, 3 Drawing Sheets

DATA STORAGE MEDIUM UTILIZING DIRECTED LIGHT BEAM AND NEAR-FIELD OPTICAL SOURCES

BACKGROUND OF THE INVENTION

1. Field of Invention

The present invention pertains to the field of information storage units. More particularly, this invention relates to an information storage unit using an array of light beam emitters or near-field optical sources to write and read data in several novel information storage media.

2. Background

Electronic devices, such as palm computers, digital cameras and cellular telephones, are becoming more compact and miniature, even as they incorporate more sophisticated data processing and storage circuitry. Moreover, types of digital communication other than text are becoming much more common, such as video, audio and graphics, requiring massive amounts of data to convey the complex information inherent therein. These developments have created an enormous demand for new storage technologies that are capable of handling more complex data at a lower cost and in a much more compact package.

One response to this demand has been the development of ultra-high density storage devices, such as the one described in U.S. Pat. No. 5,557,596 granted to Gibson et al. on Sep. 17, 1996. This system provides for a plurality of electron emitters generating beams of electrons to information storage media areas on a movable platform to store and retrieve information. A micro mover, based on micro electro mechanical systems (MEMS) technology moves the platform relative to the electron emitters to enable parallel communications with selected storage media areas on the platform. In the Gibson et al patent, an electron beam impacts storage media areas at different intensities, selectively altering some aspects of the storage material, such as changing the state of the storage material between amorphous and crystalline phases or between different crystalline phases that affects the response of, for example, a diode storage medium to a readback electron beam.

There is a continued need for increased miniaturization and expanded ability to handle greater quantities of more complex data at a faster speed and in even more compact areas. Efforts are now underway to adapt technology disclosed in the Gibson et al patent to enable the storage of data on a scale of ten nanometers (100 angstroms) up to hundreds of nanometers.

Several challenges arise in attempting to store data at this level. The processes of information storage and retrieval become increasingly difficult tasks, and writing data with electron beams presents several limitations. It is possible to use low energy electrons in this technique to avoid problems with dielectric breakdown, field emission from undesirable locations, and the need for relatively large and expensive power supplies. However, low energy electrons have very short penetration depths, making this approach highly susceptible to the surface conditions of the medium. Moreover, only very thin layers may be present on the top of the storage media, making difficult the use of a protective layer or a conducting electrode on top of the storage layer. In addition, the stability and cyclability of a storage device using electron-readback may be limited by the mechanical and thermal properties of the free surface of the storage medium. Only very thin protective cladding layers can be used with a low-energy electron-beam addressing scheme, as these layers would prevent access by low energy electrons.

In some miniature storage devices, such as CD-RW and DVD-RW drives, data is written using optical devices, such as lasers, to reversibly change the optical reflectivity of a storage medium. The diffraction-limited spot size of the lasers sets a lower bound to the size of bits to be written. Attempts have been made to circumvent the diffraction limit by using near-field light sources that provide evanescent light emitted through a small aperture. Typically, in this approach, light from a laser is emitted through an aperture having a diameter less than the wavelength of the light. Alternately, the laser is coupled with a fiber optic cable tapering down to a diameter smaller than the light wavelength and coated with a metal. In either case, an evanescent field protrudes from the aperture a short distance, resulting in the transfer of energy (evanescent coupling) with a storage medium disposed at a distance of less than a wavelength of the light from the aperture (near-field). See U.S. Pat. No. 6,185,051 granted to Chen et al. on Feb. 6, 2001. In some cases, evanescent coupling can produce a very high-quality effect, inducing more than 50% of the energy in the source of radiation to couple with the material in the near field. It is also possible to implement the present invention utilizing apertureless near-field sources, such as those described in F. Zenhausem, M. P. O'Boyle, and H. K. Wickramasinghe. Apertureless near-field optical microscope. Applied Physics Letters, 65(13): 1623–1625,1994.

Although the near-field optical method is promising for writing data at substantially increased densities, this approach presents problems in the task of reading the data. Sensing of the data may be achieved by light reflected back into the laser cavity through the small aperture. This reflected light causes a change in the output of the laser that can be monitored to detect changes in reflectivity and, thereby, the presence of bits. However, the amount of reflected light is so small that there is only a very small change in the output power of the laser, making detection difficult and susceptible to error.

To read miniature data bits, it is desirable to use a technique capable of producing substantially larger signals. Thus, structure and methods are needed to store and read high density data such that detection of data is more readily obtained.

SUMMARY OF THE INVENTION

The present invention provides a data storage unit that avoids the disadvantages of electron beam emitters and near-field optical reading, while enabling increasingly high densities of data recording and reading. In one preferred embodiment, data is written onto storage media by directing write light beams or near-field optic light onto a medium that is susceptible to changing states in response to the light beams, thereby storing data. During the data readout, the embodiments of the present invention utilize directed light beams or near-field optic systems to read the stored data. Read light beams are directed to the medium to generate different numbers of electron-hole pairs or to modify the activity of the generated electron-hole pairs, depending on the state of the medium. These electron-hole pairs can generate detectable responses, such as signal currents or voltages, or light radiation, by utilizing the storage medium embodiments described here. The generated response is measured by a detector to read the data stored in the data storage areas. In the read mode only a low level of light is needed to interact with data bits present in certain storage areas to generate enough carriers for a detectible response, via the current, voltage, or light they produce. Moreover, in certain embodiments, the carriers are accelerated through built-in or applied electric fields. This enhances the energy available for readout and provides a gain mechanism in the storage medium itself. Thus, larger readback signals are obtained in near-field recording devices from very small bits. The use of light for reading and writing, having much greater penetration depth than electron beams, enables the use of deeper storage layers, as well as protective layers over the storage layers. Optically-transparent electrodes may be placed on top of the storage layer.

In another embodiment of the preferred invention, a data storage unit comprises a data storage layer having a plurality of data storage areas for storing and reading data thereon, during read and write phases respectively. An array of directed light beam emitters are disposed in close proximity to the data storage layer to selectively direct a first light beam at a first level of energy to the data storage layer to write data in certain storage areas during the write phase and to selectively direct a second light beam at a second level of power density or energy to the data storage area to read data in certain data storage areas during the read phase. The first and second light beam may be emitted from the same or different sources. A medium is disposed on the data storage areas that can be changed between a plurality of states by the first light beam. The plurality of states exhibit substantial differences in the number of electron-hole carrier pairs generated in response to the second directed light beam and/or substantial differences in the signal generated in an external circuit depending upon the state of the storage area in which the electron-hole pairs are generated. A detection region in communication with the data storage areas is provided for determining the activity of the electron-hole pairs during the read phase, the activity of the electron-hole pairs being relative to the state of each storage areas. A detector senses the electron-hole pair activity to determine the state of each storage area.

In a variation of the above embodiment, the array of light beam emitters comprises near-field light emitters spaced less than a light wavelength from the data storage layer. The near-field light emitters selectively direct an evanescent field from selected light emitters onto the data storage layer to write and read data in the data storage areas.

Another embodiment of the present invention comprises a method for writing and reading data in a data storage unit, wherein a data storage layer in the data storage unit is provided having a plurality of data storage areas with a medium disposed thereon that is susceptible to changing states in response to light beam energy for storing and reading data thereon. A first light beam is directed to the medium to write data in certain data storage areas during the write phase by changing states of the medium using light emitters disposed in close proximity to the data storage layer. A second or the same light beam (preferably operated at a low enough power density so as not to alter the state of the storage medium) is directed to the medium to read data in certain data storage areas by generating electron-hole pairs, the number of the electron-hole pairs being relative to the state of the medium. The electron-hole pairs provide an activity or response, such as via a change in current, voltage or light radiation, for detection to determine the data stored in the storage medium. The activity of the electron-hole pairs is determined during the read phase to detect the presence of data bits in the storage areas.

In another preferred embodiment, a device is provided for reading data stored in a data storage unit, having a data storage layer with a plurality of data storage areas including a medium disposed thereon susceptible to changing states in response to the application of energy to the medium. An array of directed light beam emitters is disposed in close proximity to the data storage layer for selectively reading the data stored in the data storage areas by directing light beams to excite the medium in the data storage areas and generate electron-hole pairs, the amount of generated electron-pairs being relative to the state of the medium in each data storage area. The electron-hole pairs generate a response, via current, voltage or light radiation variations representative of the data stored in the storage areas. A detector measures the activity of the electron-hole pairs to determine the data stored in the data storage areas.

Other aspects and advantages of the present invention will become apparent from the following detailed description, which in conjunction with the accompanying drawings illustrates by way of example the principles of the present invention.

DETAILED DESCRIPTION OF THE INVENTION

Figure 1:
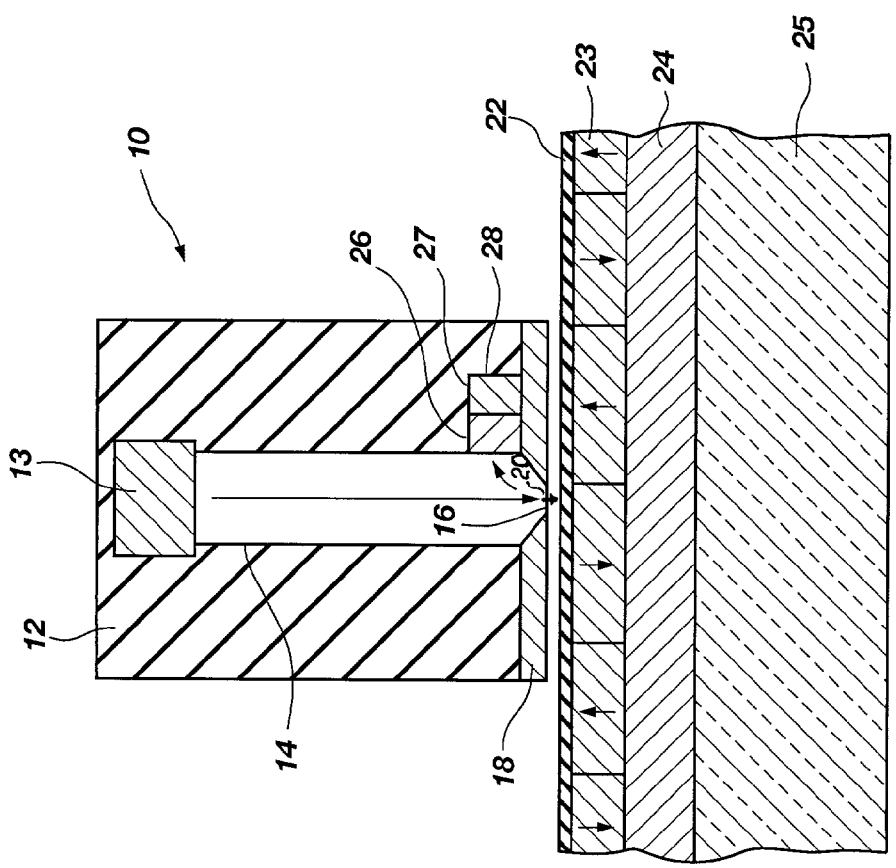
FIG. 1 is a cross-section side view of a prior art near-field optical readout head.

With reference to FIG. 1, a prior art near-field optical laser system 10 is shown. A laser system 12 includes a laser-emitting element 13, such as a semiconductor laser diode, disposed at the top of a light channel device 14, tapering down to an aperture 16 at the base of the laser body 11. The diameter of light transmitting aperture 16 extends through a light-shielding layer 18 at the base of laser system 12. Aperture 16 is smaller than a wavelength of the laser beam emitted from laser element 13. For example, the wavelength of the laser beam can be about 400 nanometers and the diameter of aperture 16 is less than the wavelength of the laser beam. The prior art device in FIG. 1 uses magnetic means to record data bits on a recording layer 23 having suitable medium thereon for recording magnetic data bits, as indicated by the direction of the arrows. A very thin protective layer 22 is formed over the top of recording layer 23. An underlayer 24 is disposed between recording layer 23 and a substrate 25.

Figure 2:
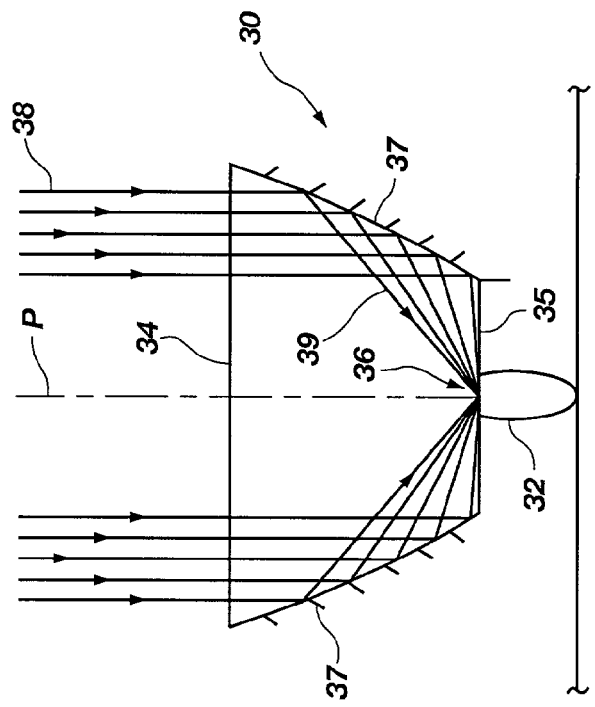
FIG. 2 is an enlarged schematic side view of a prior art near-field optical device that is also used in certain preferred embodiments of the present invention.

During readout, and during write function using the laser, a laser beam is emitted from laser emitting element 13 and is radiated through light channel device 14 to light transmitting aperture 16. The diameter of aperture 16 is smaller than the wavelength of the laser beam, causing an evanescent light field 20 to protrude from the aperture 16, as shown in FIG. 2. Preferably the recording layer 23 is disposed within the reach of the evanescent light field 20, usually a distance of less than the wavelength of the light beam.

In the prior art device shown in FIG. 1, during readout part of the light impinging on the recording layer 23 is reflected back through aperture 16 and enters directly into photo-detector 26 with a polarizer 27, which is close to aperture 16. Detector 26 outputs a signal corresponding to changes of polarization angles of the reflected light from the recording layer 23, which in turn correspond to the data bits stored therein. A reproduced signal is output from photoelectric converting element 28 that corresponds to the data stored in recording layer 23.

In FIG. 2, a prior art near-field device 30 is shown for emitting light energy through an aperture 31 having a diameter less than the wavelength of the light beam. This structure overcomes the diffraction limit for focusing light on an object, by generating an evanescent light field 32 in the vicinity of the aperture. The evanescent field protrudes from the aperture a short distance, resulting in the transfer of energy (evanescent coupling) with a storage medium 33 disposed at a distance of less than a wavelength of the light from the tip of the aperture.

The prior art near-field device 30 is defined by an incident surface 34, a bottom surface 35 and a reflective side 37. The incident surface and the bottom surface are both generally flat and disposed parallel to each other. The reflective side 37 may be parabolic shaped and is coated with a reflective surface. A collimated laser beam 38 impinges upon the incident surface 34 and passes through to sides 37. The laser beam 38 is then reflected by the sides 37 as a focused beam 39 that impinges upon the bottom surface 35 at a focal spot 36. The focal spot is located along a central axis P in very close proximity to the storage medium 33, such that the localized evanescent light field 32 interacts with medium 33 to enable data to be transduced to and from storage medium 33 by near-field coupling.

Light Sensitive Storage Layer

The present invention preferably uses a light sensitive medium in the storage areas of the storage layer that is susceptible to changing states in response to directed light beams. As used herein it is understood that the term "light beams" includes evanescent fields generated by near-field optic systems. One preferred embodiment of the light sensitive medium is a material that changes between amorphous and crystalline in response to light beams, depending on the amount, intensity and duration of the light beam. A more detailed discussion of this state change in response to electron beams is given in U.S. Pat. No. 5,557,596 (Gibson et al.). For directed light beams preferred materials include phase-change compounds incorporating the chalcogens S, Se, or Te. A wide variety of such compounds, which can be reversibly changed from the crystalline to amorphous state through the application of heat, are known in the literature. Examples of such compounds used in conventional phase-change optical recording technology include GeTeSe and AgInSbSe. In addition to changes between amorphous and crystalline states, the medium may be capable of changing between different crystalline phases or between one chemical composition and another. As used herein, the term "states" is meant to include different crystalline phases and the amorphous state, as well as variations in chemical composition, or morphology, or changes in the density, location or nature of trapped charges, or the density and type of defects that affect the relevant electrical properties. The medium also preferably has a characteristic of generating electron-hole pairs in at least one of the states when impacted by a directed light beam. Preferably, the plurality of the states of the medium exhibit substantial differences in the activity of electron-hole carrier pairs that are generated during the read phase. This electron-hole carrier pair activity can be reflected in the amount of carriers that are initially generated by the light beam, and/or by the fraction of generated carriers that flow across a diode junction (diode embodiment), that recombine while emitting radiation (photoluminescent embodiment), or that change the effective conductivity of the storage medium (photoconductivity embodiment). Thus, the nature of the data stored in each data storage area (represented by its state) is reflected in a substantial difference in the amount and the activity of electron-hole carrier pairs that are generated by a light beam directed at the medium during the read phase. Typically the read light beam is directed at a lower level of intensity than the write light beam, so as to not cause unwanted writing in the storage areas. For directed light beams, suitable materials for providing contrast between different states of the materials with regard to the activity of electron-hole carrier pairs for the three media types described herein would include various chalcogen-based compounds.

The present invention is also effective if light beams, including near-field optics, are used only in the read mode. Thus, a medium that may have had data written by means other than light beams, such as by magnetic or electrical means, may still be read using the light beam system of the present invention provided that the data storage medium has the capability to demonstrate a substantial contrast in one of the readout schemes described below.

Semiconductor Diode

Figure 3:
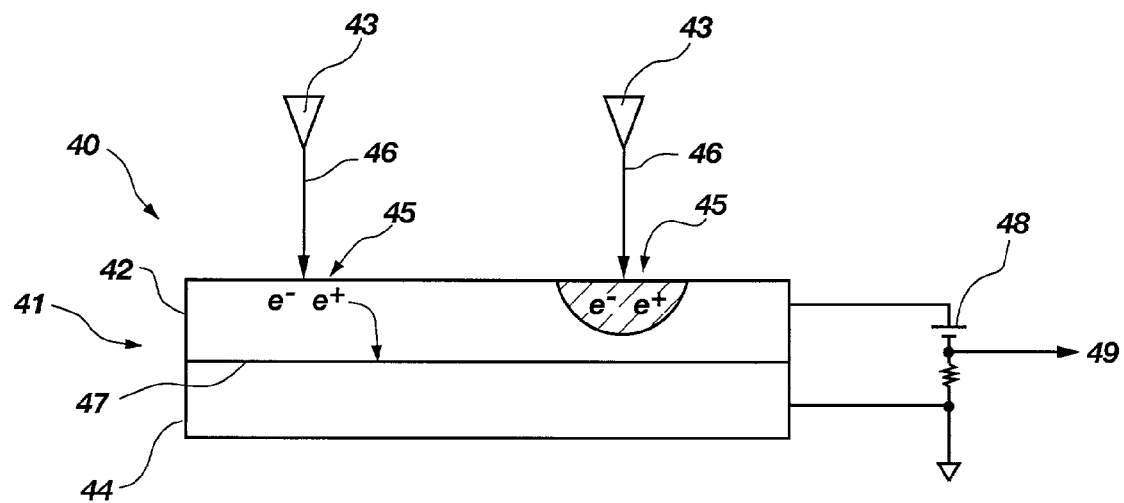
FIG. 3 is a schematic plan view of a preferred embodiment of a data storage device utilizing a semiconductor diode in accordance with the present invention.

Looking now at FIG. 3, a preferred embodiment of the present invention is shown in the form of a data storage system 40 utilizing a semiconductor diode 41. Light emitting devices 43, such as near-field optics systems, are disposed above a data storage layer 42 that comprises one layer of the diode 41. Layer 42 is disposed on an additional layer 44 to form the diode 41. The diode can be any type that provides a built-in field for separating charge carriers, such as a p-n junction, pin-junction or Schottky barrier device, depending on the materials used.

A data bit is written by locally altering the state at areas 45 of the storage layer 42 with the use of light emitting units 43 emitting directed light beams 46 on storage areas 45 in storage layer 42. The different states of the storage areas 45 must provide a contrast in bit detection during the read function.

The storage layer 42 may comprise a phase-change material as typically used in optical recording. These materials can be reversibly changed from crystalline to amorphous by applying heat at a pre-determined temperature profile over a pre-selected time period. The state may be changed from crystalline to amorphous by heating the area with a high intensity light beam, sufficient to melt the phase-change material, and then quickly decreasing the intensity of the beam to quench the area. Quenching a phase-change material causes it to cool rapidly into an amorphous state without time to anneal. The state of the storage area may be changed from amorphous to crystalline by using a light beam to heat the phase-change material just enough to anneal it. Alternatively, the materials may be changed from one crystalline state to another crystalline state using different temperatures for different time periods. The near-field evanescent light field can be regulated to apply the temperature-time profile and change the phase. Other sources of energy, such as a resistive heater or applied electric or magnetic field may be used to bias a large area of the storage layer 42 to aid the light beams 46 in locally affecting a phase change in the storage areas 45.

During the read function, the light emitters 43 emit a lower level energy field to locally excite charge carriers in the storage area 45 of the diode 41. If carriers are excited in the storage layer 42, the number of carriers created (the "generation efficiency") will depend on the state of the storage areas 45 where the light beams 46 are incident. A factor that affects generation efficiency is the band structure of the storage layer. Some fraction of the generated carriers of one sign (electrons or holes) will be swept across the diode interface 47 (the "collection efficiency) under the influence of a built-in field. An additional field may be applied across interface 47 by a voltage source 48. The current that results from carriers passing across the diode interface 47 can be monitored by a detection signal 49 taken across the interface 47 to determine the state of data storage areas 45. The collection efficiency is dependent upon, among other things, the recombination rate and mobility in and around the area on which the read photons are incident and the effect of the built-in fields.

Thus, variations in the current generated across the diode 41 by the read photons can depend on both the local generation efficiency and the local collection efficiency. Both of these factors are influenced by the state of the region upon which the photons are incident. The phase-change material of storage layer 42 can be comprised of a number of phase change materials with the appropriate electrical properties (bandgap, mobility, carrier lifetime, carrier density, etc.) including a number of chalcogenide-based phase-change materials.

Photoconductive Region

Figure 4:
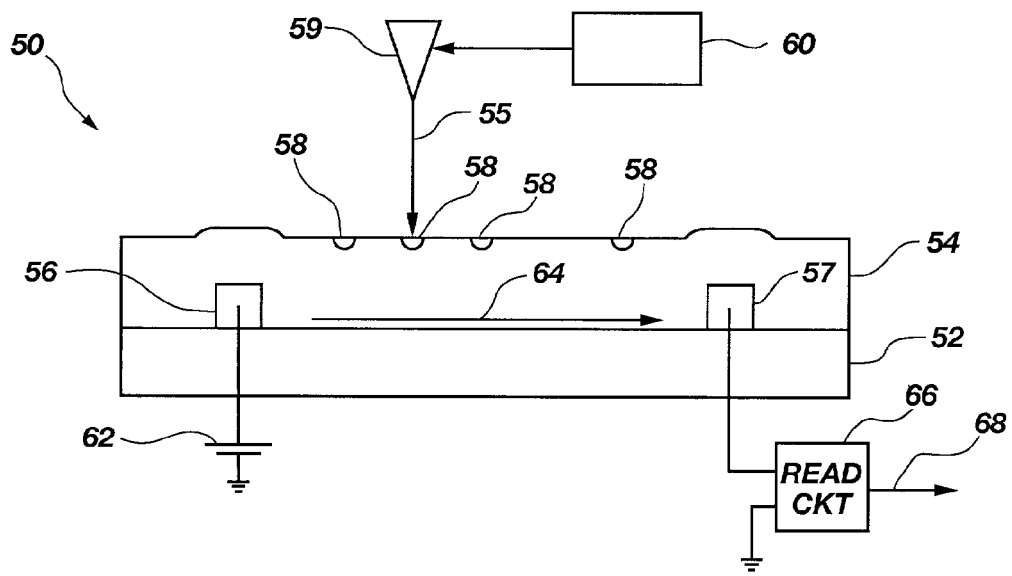
FIG. 4 is a schematic plan view of another preferred embodiment of a data storage device utilizing a photoconductivity structure in accordance with the present invention.

With reference to FIG. 4, another preferred embodiment of the present invention is depicted in which photoconductivity is utilized for the detection of recorded bits. Storage device 50 includes an electrically insulating substrate 52 and a photoconductive layer 54. The substrate 52 may be made of silicon having an oxidized top layer. The photoconductive layer 54 is disposed above the oxidized top layer and is preferably made of a chalcogenide-based phase change material having a high "dark" resistivity when not impinged upon by an energy beam. The photoconductive layer 54 may include a single layer of photoconductive material, multiple layers of the same type of photoconductive material or multiple layers of different photoconductive materials.

A plurality of spaced apart electrodes, such as electrode pair 56 and 57, make contact with the same photoconductive layer 54. The photoconductive material of layer 54 may be deposited over or under electrodes 56 and 57. A data storage region is located between electrodes 56 and 57, including multiple spaced-apart data storage areas 58, as shown in FIG. 4. The storage areas may be arranged in rows and columns, with the state of each area being determinative of the data stored therein. In one embodiment, the storage areas are of submicron size, approximately 10 nanometers to 30 nanometers in diameter and spaced about 50 nanometers apart.

An array of light beam emitters 59 is disposed above the photoconductive layer 54. Preferably the light beam emitter 59 is a near-field optics device emitting an evanescent light field, as discussed above. The electron beam 55 has appropriate time and power parameters to change the state of the storage areas 58 between amorphous and crystalline states or between different crystalline states, as discussed above. In some instances, a constant current or voltage source 60 may be used to regulate the intensity of the light beam 59. Micromovers are preferably used to scan the array of light beam emitters over the storage areas 58, as described in U.S. Pat. No. 5,986,381.

A power supply 62 applies a bias voltage across the electrodes 56 and 57 during the read function. This bias voltage induces an electric field 64 in the plane of the photoconductive layer 54. The power supply may be fabricated on the substrate 52 or may be provided outside the chip.

During read operations on the storage areas 58, light beam 59 is scanned between electrodes 56 and 57 while the bias voltage is applied to the electrodes. When the light beam 59 impacts a storage area 58, electron carriers and hole carriers are produced and accelerated by the electric field 56 towards electrodes 56 and 57. This movement of electrons and holes causes a current to flow, which is detected by a read circuit 66 to provide an output signal 68. Assuming a constant intensity of light beam 59, the rate at which electrons and holes are generated depends upon the state of the storage areas 58. If a phase-change material is used, a contrast in photocurrent magnitude results from the difference in material properties between written and unwritten areas. Because the geminate recombination rates are different for written and unwritten areas, there is a difference in the rate at which free carriers are generated. Geminate recombination rate means the rate at which initially created electron-hole pairs recombine before they are separated into free carriers. Further current magnitude contrast may be obtained from differences in the lifetime or mobility of the free carriers for written and unwritten areas. For example, in general, the mobility will be lower and carrier lifetime will be shorter in an amorphous material than in a crystalline material. Additional contrasts may arise from differences in resistivity and effects at the interface between written and unwritten areas such as the creation of built-in fields. By monitoring the changes in the magnitude of the photocurrent, the states of the storage areas 58 can be determined. The output 68 from read circuit 66 may be amplified and converted from analog to a digital value if desired.

Photoluminescent Region

Figure 5:
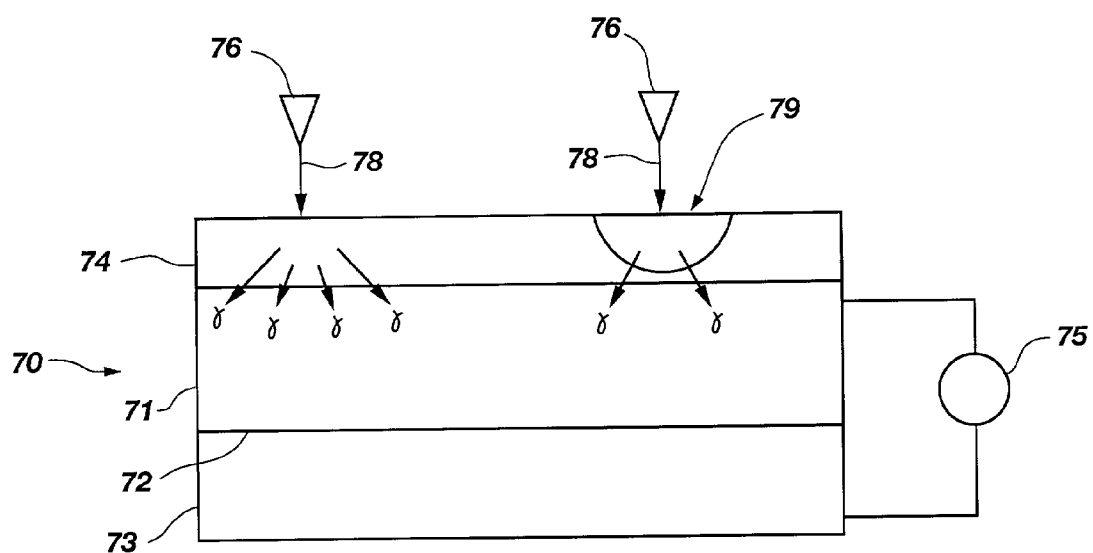
FIG. 5 is a schematic plan view of another preferred embodiment of a data storage device utilizing a photoluminescent structure in accordance with the present invention.

Referring now to FIG. 5, another preferred embodiment of the present invention is shown, in which the activity of the electron-hole pairs generated during the read process is detected via their radiative recombination. In this embodiment the storage layer is a photoluminescent material in one of its states or potentially in more than one of its states if multibit recording is used. Alternatively, the photo-luminescent material could have different luminescent properties in each of its states. For example, the material could luminesce at different wavelengths in each state. A photo-detector, such as a photodiode or microfabricated photomultiplier tube may be used for photon detection. As shown in FIG. 5, a photodiode has a photodiode interface 72 between upper layer 71 and lower layer 73. A storage layer 74 composed of photoluminescent material is deposited on the surface of upper layer 71. Light emitters 76 are disposed near the surface of storage layer 74 to direct light beams 78 onto the surface. Preferably near-field light sources are used, as described above.

Data is stored in the storage layer 74 by applying the light beams 78 in selected storage areas 79 to alter the light-emitting properties of the photoluminescent storage layer. The photoluminescent material can be any one of a number of chalcogenide-based phase-change materials. The light emitting properties may be altered in a number of different ways, such as by changing the electronic band structure, i.e., from a direct band gap material to an indirect band gap material, by altering the ratio of the non-radiative to radiative recombination rates, or by changing the wavelength or escape efficiency of the light emitted by the material.

During the read mode, the light beams 78 have a lower power intensity to prevent undesired writing. The written storage areas 79 will emit a different number of photons than the other areas on the storage layer 74 that have not been written. The emitted photons will generate a current of electron and hole carriers in the photodiode, some of which will cross the photodiode interface 72. A meter 75 connected between the layers of photodiode 70 measures the current or voltage across the photodiode interface 72 as each storage area is impacted by a light beam to determine whether each storage area has been altered to store data bits.

Additional Layers

Since light beams are being used, it is possible and may be advantageous to cover the storage layer with electrodes. For example, uniform top and bottom electrodes will enhance the uniformity of the biasing field formed between the top electrode and the storage layer. A back electrode could be present, either on the side of the substrate opposite the optical sources, if a conducting substrate is used, or on top of the substrate, if an electrically isolated substrate is used that provides mechanical support only. Using an optical beam, a top electrode can be used that covers the entire top surface of the device.

The storage layer may also be covered with a protective layer to prevent chemical changes, such as oxidation or thermo-mechanical changes such as bump or pit formation, during the write mode, as long as it is thin enough to allow writing of small bits. The protective layer may be merely a passivation layer or a conducting transparent electrode that is used to collect the photo-generated carriers.

The storage layer may also be covered with a layer that enhances thermal properties of the overall storage medium. For example, if the storage layer is a phase-change material, it may be desirable for it to be in contact with a layer that aids in thermal quenching by acting as a heat sink when changing the state of the materials to an amorphous state. Alternately, or in conjunction with a cover layer, it may be desirable to have a layer underneath the storage layer or adjacent layer that improves thermal properties, such as the ability to quench and amorphize the storage layer. A protective underlayer may also enhance the robustness of the device by preventing interdiffusion between the storage layer and the substrate material, or by discouraging delamination or dewetting of the storage layer from the substrate.

A layer covering the storage layer may also be used to enhance optical properties, such as an anti-reflection coating. Such a coating could be used to increase the amount of light from the light source that is absorbed in the storage layer or the adjacent layer. Alternately, or in conjunction with a cover layer, a layer underneath the storage layer could be used to enhance optical properties.

During the read mode, the light beam may be varied as needed. The light beam may be applied in a constant mode, with the light source on continually and the sampling window provided by translation or rotation of the media beneath the source. Alternately, the optical source might be pulsed or otherwise modulated to use a phase-selective or frequency-selective signal-to-noise enhancement technique in the diode signal amplifier electronics.

Although the above embodiments are representative of the present invention, other embodiments will be apparent to those skilled in the art from a consideration of this specification and the appended claims, or from a practice of the embodiments of the disclosed invention. It is intended that the specification and embodiments therein be considered as exemplary only, with the present invention being defined by the claims and their equivalents.

What is claimed is:

1. A data storage unit, comprising:
   a data storage layer having a plurality of data storage areas for storing and reading data thereon during read and write phases, respectively;
   an array of directed light beam emitters in close proximity to the data storage layer for selectively directing a first light beam to the data storage layer to write data in certain data storage areas during the write phase and for selectively directing a second light beam to the data storage layer to read data in certain data storage areas during a read phase;
   a medium disposed on the data storage areas that changes between a plurality of states in response to the first directed light beam during the write phase, and that generates electron-hole pairs in response to the second directed light beam during the read phase, the plurality of states exhibiting substantial differences in the activity of electron-hole carrier pairs generated in response to the second directed light beam;
   a detection region in communication with the data storage areas for determining the activity of the electron-hole pairs during the read phase, the activity of electron-hole pairs being relative to the state of each storage areas; and
   a detector associated with the detection region for measuring the activity of the electron-hole carrier pairs to determine the data stored in the data storage areas.

2. The data storage unit as recited in claim 1, wherein the array of light beam emitters comprises near-field light emitters for selectively directing an evanescent field from the light emitters onto the data storage layer to write data into the data storage areas and to read said data.

3. The data storage unit as recited in claim 1, wherein the detection region is the junction of a semiconductor diode and the activity of the electron-hole carrier pairs comprises the amount of electron-hole carrier pairs that flow across the junction of a semiconductor diode.

4. The data storage unit as recited in claim 3, wherein the detector for measuring electron-hole carrier pair activity is a voltage detector for measuring the photovoltage developed across the junction.

5. The data storage unit as recited in claim 3, wherein the detector for measuring the amount of electrical carrier flow is a meter for measuring the flow of carriers across the semiconductor diode junction.

6. The data storage unit as recited in claim 1, wherein the region for detecting the electron-hole carrier pair activity comprises a photoconductivity region having a photoconductive material and two spaced apart electrodes with a potential across the two electrodes to direct the carrier flow between the electrodes in the photoconductive material.

7. The data storage unit as recited in claim 6, wherein the detector for measuring the amount of electrical carrier flow is a meter for measuring the flow of carriers between the electrodes in the photoconductive material.

8. The data storage unit as recited in claim 1, wherein the medium is a photo-luminescent material responsive to the second light beam for generating photon emissions in response to the recombination of the electron-hole carrier pairs generated during the read phase.

9. The data storage unit as recited in claim 8, wherein the detector region is a photodiode for generating current in response to the photon emissions.

10. The data storage unit as recited in claim 1, and further comprising a layer superimposed over the storage layer to protect the storage layer.

11. The data storage unit as recited in claim 1, wherein the medium comprises a material susceptible to changing states in response to the first directed light beam.

12. The data storage unit as recited in claim 1, and further comprising a secondary layer adjacent to the storage layer to enhance the thermal properties of the data storage unit.

13. The data storage unit as recited in claim 1, and further comprising a secondary layer adjacent to the storage layer to enhance the optical properties of the data storage unit.

14. The data storage unit as recited in claim 1, and further comprising a secondary energy source for biasing the storage areas to facilitate data storage or reading.

15. A device for reading data stored in a data storage unit, comprising:
    a data storage layer having a plurality of data storage areas including a medium disposed thereon susceptible to changing states in response to the application of energy to the medium;
    an array of directed light beam emitters in close proximity to the data storage layer for selectively reading the data stored in the data storage areas by directing light beams to excite the medium in the data storage areas and generate electron-hole pairs, the activity of generated electron-pairs being relative to the state of the medium in each data storage area;
    a detection region in communication with the data storage areas for detecting the activity of the electron-hole pairs during the read phase, the amount of activity being variable in response to excitation of the data storage areas by the light beam emitters and the state of the data storage areas; and
    a detector for measuring the amount of electron-hole carrier pair activity in the detection region to determine the data stored in the data storage areas.

16. The device for reading data as recited in claim 15, wherein the array of light beam emitters comprises near-field light emitters spaced less than a light wavelength from the data storage layer for selectively directing an evanescent field from the light emitters onto the data storage layer to write data into the data storage areas and to read said data.

17. The device for reading data as recited in claim 15, wherein the region for detection of electron-hole pair activity comprises a semiconductor diode junction having a potential across the junction for directing the carrier flow across the junction and wherein the electron-hole pair activity comprises the amount of electron-hole pairs flowing across the junction.

18. The device for reading data as recited in claim 15, wherein the region for controlling the detection of the electron-hole carrier activity comprises a photoconductivity region having a photoconductive material and two electrodes with a potential across the two electrodes to direct the carrier flow between an emitter electrode and a receptor electrode in the photoconductive material and wherein the electron-hole carrier activity is the amount of electron-hole carriers that reach the receptor electrode.

19. The device for reading data as recited in claim 15, wherein the medium is a photo-luminescent material responsive to the directed light beam for generating photon emissions in response to the recombination of the electron-hole carrier pairs generated during the read phase.

20. A method for writing and reading data in a data storage unit including a data storage layer having a plurality of data storage areas with a medium disposed thereon that is susceptible to changing states in response to light beam energy for storing and reading data thereon during read and write phases, respectively, comprising:
    selectively directing a first light beam to the medium to write data in certain data storage areas during the write phase by changing states of the medium using light beam emitters in close proximity to the data storage layer;
    selectively directing a second light beam to the medium on the data storage areas to read data in certain data storage areas during the read phase by generating electron-hole pairs, the activity of the electron-hole pairs being relative to the state of the medium;
    determining the activity of the electron-hole pairs during the read phase, the activity being in a detection region in communication with the data storage areas, the activity of electron-hole pairs being dependent on the state of each of the data storage areas; and
    measuring the amount of electron-hole carrier pair activity in the detection region to detect the presence of data bits in the storage areas.

21. The method for storing and reading data recited in claim 20 wherein the step of selectively directing first and second light beams comprises:
    arranging an array of near-field light emitters spaced less than a light wavelength from the data storage layer;
    generating from the near-field light emitters a plurality of evanescent light fields in contact with the data storage layer to write the data on the medium in the data storage areas during the write phase and to read the data from the data storage areas during the read phase.

22. The method for storing and reading data recited in claim 20 wherein the electron-hole carrier pair activity is generated by carriers generated in the data storage layer in response to light from the light beams.

23. The method of storing and reading data recited in claim 20 wherein the electron-hole carrier pair activity is generated by photons generated in the data storage layer in response to light from the light beams.

24. The method of storing and reading data recited in claim 20 wherein during the read phase, the light beams are directed toward the storage area in a constant flux mode.

25. The method of storing and reading data recited in claim 20 wherein the light beams are directed toward the storage area in a modulated flux mode.

* * * * *